United States Patent [19]

Hobes et al.

[11] 4,394,483
[45] Jul. 19, 1983

[54] SAPONIFICATION OF ETHYLENE COPOLYMERS SUSPENDED IN KETONE

[75] Inventors: Victor J. Hobes, Dinslaken; Wolfgang Payer, Wesel, both of Fed. Rep. of Germany

[73] Assignee: Ruhechemie Aktiengesellschaft, Fed. Rep. of Germany

[21] Appl. No.: 326,565

[22] Filed: Dec. 2, 1981

[30] Foreign Application Priority Data

Dec. 6, 1980 [DE] Fed. Rep. of Germany ....... 3046144

[51] Int. Cl.$^3$ .............................................. C08F 8/12
[52] U.S. Cl. .................................. 525/60; 525/366; 525/369; 526/317
[58] Field of Search .......................... 525/369, 60, 366

[56] References Cited

U.S. PATENT DOCUMENTS 3,789,035  1/1974  Iwami et al. ...................... 525/369

*Primary Examiner*—Stanford M. Levin
*Attorney, Agent, or Firm*—Jordan B. Bierman; Linda Bierman

[57] ABSTRACT

A method for the production of certain ethylene copolymers which comprises saponifying a granular feedstock which includes a polymer of at least 50% ethylene, 2 to 50% of certain esters of $C_3$ to $C_{12}$ alkene carboxylic acids, 0 to 30% vinyl esters of certain aliphatic carboxylic acids having 1 to 6 carbon atoms, and up to 3% of $C_3$ to $C_{12}$ alkene carboxylic acids. In particular, the improvement comprises maintaining the feedstock at a particle size range of 0.1 to 8.0 mm, and suspending it in 1–10 parts of a ketone to 1 part of the feedstock, the ketone being of the formula.

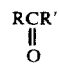

wherein R and R' are individually an alkyl radical having 1 to 6 carbon atoms, and carrying out the saponification at a temperature of 40° to 75° C. in the presence of at least one alkaline saponifying agent. The resulting compounds are useful as adhesives and coating materials.

9 Claims, No Drawings

SAPONIFICATION OF ETHYLENE COPOLYMERS SUSPENDED IN KETONE

This Application claims the benefit of the priority of German Application P 30 46 144.0, filed December 6, 1980.

The present invention is directed to a method for the production of certain ethylene copolymers; more particularly, such copolymers containing at least 60% ethylene, 0 to 20% esters of $C_3$ to $C_{12}$ alkene carboxylic acids with $C_1$ to $C_8$ primary alcohols, and 1 to 20% by weight of $C_3$ to $C_{12}$ alkene carboxylic acids. It is also contemplated that minor amounts of additional conventional monomers, which are copolymerizable with ethylene, may be used.

The production of copolymers containing alkene carboxylic acids is known. For example, mixtures of ethylene, alkene carboxylic acids, and additional monomers can be converted at high pressures and high temperatures by means of radical-forming initiators (see e.g. DOS 24 00 978 and DOS 16 69 685). However, there is a substantial drawback to the foregoing procedure. Specifically, the free alkene carboxylic acids are highly corrosive and will damage equipment with which they come into contact under the reaction conditions. Moreover, the polymers obtained are highly discolored.

In order to overcome this problem, other known methods have used esters of the alkene carboxylic acids as the monomers in the polymerization process, and subsequently split off the alcohol residue. In the case of esters of secondary and tertiary alcohols, this can be affected hydrolytically or pyrolytically. However, in the case of esters of primary alcohols, only hydrolytic splitting is possible.

The hydrolytic splitting takes place in solution and requires extremely long residence times. The product must, thereafter, be isolated by precipitation. This is very expensive and, as a result, the procedure is of minor importance.

It is, therefore, among the objects of the present invention to provide a process which will produce homogeneous, non cross-linked and non discolored ethylene copolymers containing alkene carboxylic acids.

It has been discovered, in accordance with the present invention, that ethylene copolymers containing more than 60% by weight of ethylene, 0 to 20% by weight of esters of $C_3$ to $C_{12}$ alkene carboxylic acids with $C_1$ to $C_8$ primary alcohols, and 1 to 20% by weight of $C_3$ to $C_{12}$ alkene carboxylic acids can be produced as hereinafter set forth. Such copolymers may, if desired, also include minor amounts of additional conventional monomers which are copolymerizable with ethylene.

The process of the present invention is carried out by polymerizing monomer mixtures comprising at least 50% by weight of ethylene, 2 to 50% by weight of esters of $C_3$ to $C_{12}$ alkene carboxylic acids with $C_1$ to $C_8$ primary alcohols, 0 to 30% by weight of vinyl esters of a saturated, monobasic, aliphatic carboxylic acid having 1 to 6 carbon atoms, and up to 3% by weight of $C_3$ to $C_{12}$ alkene carboxylic acids. Minor amounts of additional monomers which are copolymerizable with ethylene may also be included. The polymerization reaction may be advantageously carried out at pressures of 100 to 8,000 bars and temperatures of 110° to 350° C., in the presence of catalytic amounts of radical-forming initiators to provide the feedstock of the present invention.

The feedstock is suspended in a ketone, in a ratio of one part by weight of feedstock with a particle size of 0.1 to 8.0 mm, to 1 to 10 parts by weight of the ketone. The preferable particle size is 1 to 5 mm and the ketones are of the formula

wherein R and R' are individually a straight or branched chain alkyl radicals having 1 to 6 carbon atoms. The alkene carboxylic acid esters of primary alcohols contained in the polymer are saponified at temperatures of 40° to 75° C. in the presence of alkaline saponification agents. The granular structure is retained.

Saponification agents which have been found useful in the present process include alkali metal hydroxides, such as sodium hydroxide and potassium hydroxide, and alkali metal methylates and ethylates, such as sodium methylate and potassium methylate. These agents may be added to the polymer suspension in solid form, or as an alcoholic solution. There may be introduced all at once, in portions, or continuously.

Among the additional monomers copolymerizable with ethylene, which may also be contained in the polymers of the present invention, are $C_3$ to $C_8$ alkenes, esters of $C_3$ to $C_{12}$ alkenecarboxylic acids with secondary or tertiary alcohols; vinyl and alkenyl esters; vinyl and alkenyl ethers; vinyl and alkenyl alcohols; N-vinyl and N-alkenyl compounds such as N-vinylpyrrolidone, N-vinylcarbazole, N-vinylcaprolactam; acrylamide and methacrylamide; acrylonitrile and methacrylonitrile; alkenyl halides such as vinyl fluoride and vinylidene fluoride; vinyl and alkenyl ketones; vinyl and alkenyl sulphones and sulphonates; dicarbonates; acid anhydrides; and styrene. In the same manner as ethylenically unsaturated compounds, other copolymerizable substances such as carbon monoxide and sulfur dioxide may also be incorporated by polymerization.

The preparation of the copolymers which are capable of being saponified in accordance with the present invention has been described in Ullmanns Encyclopädie der technischen Chemie, 3rd Edition, (1963), Vol. 14, p. 139. The process may be carried out in autoclaves or in tubular reactors. It is most desirable that it be carried out continuously, with the unreacted monomer being recycled. The conversion takes place in the presence of catalytic amounts of radical-forming initiators, e.g. oxygen, in amounts of 2 to 250 mol ppm based upon the ethylene being polymerized. Peroxides such as tert. butyl perbenzoate, dilauroyl peroxide, di-tert. butyl peroxide or azobutyric acid dinitrile may be used in place of oxygen in amounts of 2 to 200 mol ppm. It has been found advantageous to carry out the polymerization in the presence of moderators such as aliphatic alcohols and carbonyl compounds, saturated and unsaturated hydrocarbons or chlorinated hydrocarbons, and hydrogen. Since the foregoing process results in a particle size range of 0.8 to 8.0 mm, no additional grinding processes are necessary.

An important feature of the present invention is the suspension of the starting granulate or feedstock in certain ketones. In particular, acetone, methyl ethyl ketone, and methyl isobutyl ketone are useful. These substances diffuse into the interior of the grains and carry with them the dissolved saponification agents.

Normally, 1 to 10 parts by weight (preferably 2 to 6 parts by weight) of ketone are used per part by weight of copolymer. The ketones may be used as pure substances, or also as mixtures. It is important that the ketone swells—but does not dissolve—the copolymer feedstock at temperatures below the melting point range of the starting product. These temperatures are about 5° to 10° C. below the temperatures at which the melting process starts.

The amount of saponification agent is not critical. It may be used in stoichiometric amounts based upon tha alkene carboxylic acid esters being incorporated by polymerization. It also may be used in greater or less quantities. The degree of saponification can be controlled depending upon the amount of catalyst used. When catalyst is used in excess, the alkene carboxylic acid esters are saponified almost quantitatively. The use of stoichiometric or sub-stoichiometric amounts of saponification agent results in reaction products which contain varying amounts of unsaponified alkene carboxylic acid esters.

The degree of saponification can also be influenced by controlling the residence time. This depends upon the operating temperature, granular size, and the amount of alkene carboxylic acid esters to be incorporated. It has been found that saponification time is generally 0.5 to 10 hours, especially 0.5 to 5 hours, and preferably 2 to 4 hours. It should be noted that the lower the operating temperature, the larger the particles, and the higher the proportion of alkene carboxylic acid esters, the longer the residence time required.

The saponification can be carried out very simply. It is merely necessary to suspend the polymer in the ketone and then heat the suspension to the desired temperature with stirring. The saponification agent is added, and the mixture is allowed to react until the desired degree of saponification has been obtained.

It has been found that the polymers according to the present invention are useful as adhesives and, when ground, as coating materials, as well.

The following Examples are intended to illustrate the invention:

EXAMPLE 1

100 g of granulated ethylene/n-butyl acrylate copolymer containing 25% by weight (based on the polymer) of n-butyl acrylate and having a melt index (190° C./2 kg) of 8.0 g/10 minutes, 800 ml of methyl ethyl ketone, and 60 g of KOH (86%, four times the amount equivalent to the n-butyl acrylate) dissolved in 200 ml of methanol, are placed in a 2 liter volume flask equipped with a stirrer, a reflux condenser and a contact thermometer. After 5 hours reaction time at 74° C., the reaction mixture is cooled to about 50° C., the granulate is suction filtered, de-ionised at the reflux temperature (74° C.) with 50 ml of 32% hydrochloric acid in 500 ml of methyl ethyl ketone, and washed four times with 500 ml of an acetone/water mixture (9:1) at 60° C. After drying at 60° C. in a through-circulation drying chamber, 90 g of a colorless reaction product containing 13.4% of acrylic acid and 3.7% of n-butyl acrylate, corresponding to a degree of saponification of 85%, is obtained. The melt index (190° C./2 kg) of the polymer is 3.0 g/10 minutes.

EXAMPLE 2

100 g of granulated ethylene/2-ethylhexyl acrylate copolymer containing 19% (based on the polymer) of 2-ethylhexyl acrylate incorporated by polymerizatio.. and having a melt index (190° C./2 kg) of 33 g/10 minutes, 800 ml of methyl ethyl ketone, and 20 g of KOH (86%, which is three times the amount equivalent to the 2-ethylhexyl acrylate) dissolved in 100 ml of methanol, are placed in a 2 liter flask equipped with a stirrer, a reflux condenser and a contact thermometer. After 5 hours reaction time at 74° C., the granulate is suction filtered, de-ionised at the reflux temperature (74° C.) with 70 ml of 32% hydrochloric acid in 500 ml of methyl ethyl ketone, and washed four times with 500 ml of an acetone/water mixture (9:1). After drying at 60° C. in a through-circulation drying chamber, 89 g of colorless granulate is obtained which contains 7.7% of acrylic acid and 1.7% of 2-ethylhexyl acrylate, corresponding to a degree of saponification of 91.6%; the melt index (190° C./2 kg) is 21 g/10 minutes.

EXAMPLE 3

100 g of granulated ethylene/ethyl acrylate copolymer containing 18% by weight (based on the polymer) of ethyl acrylate incorporated by polymerization and having a melt index (190° C./2 kg) of 5.2 g/10 minutes, 800 ml of methyl ethyl ketone and 47 g of KOH (86%, which is four times the amount equivalent to the ethyl acrylate) dissolved in 200 ml of methanol are placed in a 2 liter flask equipped with a stirrer, a reflux condenser and a contact thermometer. After 5 hours reaction time at 74° C., the reaction mixture is cooled to about 50° C., and the granulate is suction filtered and washed with 50 ml of 32% hydrochloric acid in 500 ml of an acetone/water mixture (9:1) at 60° C. After drying at 60° C. in a through-circulation drying chamber, 95 g of a colorless saponification product is obtained containing 7.1% of acrylic acid and 9.0% of ethyl acrylate, corresponding to a degree of saponification of 52%; the melt index (190° C./2 kg) is 0.15 g/10 minutes.

While only a limited number of specific examples of the present invention have been expressly set forth, it is, nonetheless, to be broadly construed, and not to be limited except by the character of the claims appended hereto.

What we claim is:

1. In a process for the production of ethylene copolymers comprising by weight
   (1) more than 60% polyethylene,
   (2) 0 to 20% polyesters of $C_3$ to $C_{12}$ alkenecarboxylic acids with $C_1$ to $C_8$ primary alcohols,
   (3) 1 to 20% $C_3$ to $C_{12}$ polyalkenecarboxylic acids, ps comprising saponifying a feedstock comprising by weight a granular polymer or
   (a) at least 50% ethylene,
   (b) 2 to 50% esters of $C_3$ to $C_{12}$ alkenecarboxylic acids with $C_1$ to $C_8$ primary alcohols,
   (c) 0 to 30% vinyl esters of saturated monobasic, aliphatic carboxylic acids with 1 to 6 carbon atoms, and
   (d) up to 3% $C_3$ to $C_{12}$ alkenecarboxylic acids, the improvement which comprises said feedstock having a particle size of 0.1 to 8.0 mm, and being suspended in a liquid phase consisting essentially of a ketone, there being 1 part of said feedstock to 1-10 parts of said ketone, said ketone being of the formula

wherein R and R¹ are individually a straight or branched chain alkyl radical having 1 to 6 carbon atoms, and carrying out the saponification of the polyester of alkenecarboxylic acids with primary alcohols at 40° to 75° C. in the presence of at least one alkaline saponifying agent, while retaining the granular structure thereof.

2. The process of claim 1 wherein one part of said feedstock is suspended in 2 to 8 parts by weight of said ketone.

3. The process of claim 1 wherein said ketone is acetone, methyl ethyl ketone, methyl isobutyl ketone, or mixtures thereof.

4. The process of claim 1 wherein said agent is an alkali metal hydroxide.

5. The process of claim 1 wherein said particle size is 1.0 to 5.0 mm.

6. The process of claim 1 wherein said ketone swells but does not dissolve said feedstock at a temperature below the temperature at which melting of said feedstock starts.

7. The process of claim 1 wherein said saponification is carried out for 0.5 to 10 hours.

8. The process of claim 7 wherein said saponification is carried out for 0.5 to 5 hours.

9. The process of claim 8 wherein said saponification is carried out for 2 to 4 hours.

* * * * *